United States Patent
Sakr et al.

(10) Patent No.: US 12,206,273 B2
(45) Date of Patent: Jan. 21, 2025

(54) UNIVERSAL AND VERSATILE CHARGER FOR ELECTRIC VEHICLE BATTERY

(71) Applicant: WATT & WELL, Pertuis (FR)

(72) Inventors: Nadim Sakr, Massy (FR); Raul Iglesias, Massy (FR)

(73) Assignee: Watt & Well, Pertuis (FR)

( * ) Notice: Subject to any disclaimer, the term of this patent is extended or adjusted under 35 U.S.C. 154(b) by 456 days.

(21) Appl. No.: 17/676,991

(22) Filed: Feb. 22, 2022

(65) Prior Publication Data
US 2022/0271554 A1 Aug. 25, 2022

(30) Foreign Application Priority Data
Feb. 22, 2021 (EP) ..................................... 21158361

(51) Int. Cl.
*H02J 7/00* (2006.01)
*B60L 53/16* (2019.01)
*B60L 53/20* (2019.01)

(52) U.S. Cl.
CPC .......... *H02J 7/00712* (2020.01); *B60L 53/16* (2019.02); *B60L 53/20* (2019.02); *B60L 2210/10* (2013.01); *B60L 2210/30* (2013.01); *H02J 2207/20* (2020.01)

(58) Field of Classification Search
CPC .................................................. H02J 7/00712
USPC ........................................................ 320/109
See application file for complete search history.

(56) References Cited

U.S. PATENT DOCUMENTS

| | | | |
|---|---|---|---|
| 2005/0046387 A1* | 3/2005 | Aker ...................... | H02J 7/0048 320/125 |
| 2012/0286740 A1 | 11/2012 | Loudot et al. | |
| 2019/0245432 A1* | 8/2019 | Yan ................... | H02M 3/33576 |
| 2019/0312509 A1 | 10/2019 | Kim et al. | |
| 2019/0359073 A1* | 11/2019 | Song ..................... | H02J 7/0068 |

(Continued)

FOREIGN PATENT DOCUMENTS

| | | |
|---|---|---|
| CN | 111355287 A | 6/2020 |
| EP | 2406098 A1 | 1/2012 |

(Continued)

OTHER PUBLICATIONS

Lu et al., A Modular Designed Three-phase High-efficiency High-power-density EV Battery Charger Using Dual/Triple-Phase-Shift Control, IEEE Transactions on Power Electronics, vol. 33, Issue 9, (2018).

(Continued)

*Primary Examiner* — Yalkew Fantu
(74) *Attorney, Agent, or Firm* — Jordan IP Law, LLC; Todd A. Vaughn

(57) ABSTRACT

A charger operable to charge a battery of an electric vehicle from an electric power grid. The charger includes a first connector unit operable to connect the charger to the electric power grid, an AC/DC converter, a set of filters provided between the first connector unit and the AC/DC converter, a second connector unit operable to connect the charger to the battery, and a configurator provided between the first connector unit and the set of filters, the configurator being provided with a set of switches and/or relays operable to switch between a three-phase operation and a single-phase operation to charge the battery from the electric power grid.

12 Claims, 7 Drawing Sheets

(56) References Cited

U.S. PATENT DOCUMENTS

2020/0321797 A1\* 10/2020 Gerrits .................. B60L 53/52

FOREIGN PATENT DOCUMENTS

| EP | 3621174 A1 | 3/2020 |
| EP | 3648322 A1 | 5/2020 |

OTHER PUBLICATIONS

Schmenger et al., A 22 kW On-board Charger for Automotive Applications Based on a Modular Design, IEEE Conference on Energy Conversion (CENCON) (2014).
Stengert, On-board 22 kW fast charger "NLG6," World Electric Vehicle Symposium and Exhibition (EVS27)(2013).

\* cited by examiner

UNIVERSAL AND VERSATILE CHARGER FOR ELECTRIC VEHICLE BATTERY

CROSS-REFERENCE TO RELATED APPLICATIONS

The present application claims priority under 35 U.S.C. § 119 to European Patent Publication No. EP 21158361.2 (filed on Feb. 22, 2021), which is hereby incorporated by reference in its complete entirety.

TECHNICAL FIELD

The present disclosure relates to electrical engineering, and in particular, to circuit arrangements for charging batteries or for supplying load from batteries. More precisely, the present disclosure relates to grid tied converters in general, and to electric-vehicle (EV) battery chargers, in particular.

BACKGROUND

Charging the battery of an electrical vehicle takes longer than refueling a tank. This is considered to be a drawback of electrical vehicles. There is an obvious need for faster charging of electrical vehicles. The charging time depends both on the characteristics of the batteries used in the vehicle and on the charger used for charging said batteries.

Another drawback of electrical vehicles is related to the different electrical characteristics of the grid that can be connected to a charger. Besides issues related to compatibility of the plugs at the charging station (also called "charge point"), there are at least two different electrical characteristics used in grids connected to chargers, namely single-phase topologies and three-phase topologies. Some chargers can be adapted to both topologies, but this requires manual switching. It would be desirable to have a charger that can automatically adapt to both topologies.

Three-phase topologies are very common for AC charger applications. They allow P [kW] charging power in three-phase operation. They also enable single-phase charging operation, but only for a reduced power of ⅓ of the nominal three-phase power since the power components in each phase are only rated for the current occurring for nominal three-phase operation. The charging time in single-phase mode is thus nearly three times longer than in the three-phase case.

As an example, U.S. Patent Publication No. 2012/286 740 discloses a charger for a vehicle battery allowing to recharge the battery directly from a single-phase or from a three-phase power supply network (grid). However, this device has the same shortcoming as conventional single-phase chargers: the charging current in single-phase mode is very low.

Various three-phase charger circuit designs suitable for electrical vehicle batteries have been described in the literature, see for instance: J. Lu et al., "*A Modular Designed Three-phase High-efficiency High-power-density EV Battery Charger Using Dual/Triple-Phase-Shift Control*", published in IEEE Transactions on Power Electronics, vol. 33 (9), p. 8091-8100 (2018); J. Schmenger et al., "*A 22 kW On-board Charger for Automotive Applications Based on a Modular Design*", published in the 2014 IEEE Conference on Energy Conversion (CENCON), Johor Bahru, 2014, p. 1-6; K. Stengert, "*On-board 22 kW fast charger "LLG6"*", published in EVS27 International Battery, Hybrid and Fuel Cell Electric Vehicle Symposium, Barcelona November 2013, doi.org/10.1109/EVS. 2013.6914854.

Another problem will arise when the battery of the electrical vehicle is used with an external load. During times of non-use of the electric vehicle, the vehicle batteries can be used to provide emergency back-up energy in the case of an electric grid outage or to serve as a generator for camping, construction sites, concerts, parties, and other areas where there are limited grid connections. This mode of operation is known as vehicle-to-load or V2L. In case of a three-phase classic bidirectional charger topology, only one load can be connected between two different power lines; this may be a limitation of use. Furthermore, using the vehicle battery with an external load will obviously reinforce the need to speed up the charging process of the battery.

There is a need for a versatile charger that can be adapted to different grid topologies, that allows fast charging in both single-phase and three-phase operation, and that allows more versatile use with external loads.

More precisely, one technical problem dealt with by the present disclosure is how to reduce the charging time in a single-phase charging when utilizing a charger that is designed for use with both single-phase and three-phase topology.

Another technical problem dealt with by the present disclosure is how to overcome mechanical switching wear problems of a mechanical switch used for switching between a single-phase operation mode and a three-phase operating mode.

Another technical problem dealt with in the present disclosure is to provide a charger which can be used with virtually any grid configuration, and in particular in single-phase mode, three-phase mode, four-phase mode, two-phase mode, as well as in V2L mode.

Another technical problem dealt with in the present disclosure is to provide a charger capable of automatically adjusting to the grid topology.

SUMMARY

The term grid configuration refers herein to three-phase with or without neutral at p [kW], bi-phase or single-phase charging at p/3 [kW] and 2*p/3 [kW]).

One exemplary embodiment of the disclosed subject matter is a universal and versatile charger device for EV (electronic vehicle) battery that can be connected to any type of grid or load. The universal and versatile charger according to the present disclosure comprises a four-phase PFC (power factor correction) rectifier along with four-phase EMI (electromagnetic interference) filter structure suitable for three-phase, two-phase and single-phase operation. According to some embodiments, the universal and versatile charger for EV (electronic vehicle) battery employs one or multiple four-phase common mode chokes that effectively attenuate the generated common mode noises in all operation modes.

One technical problem dealt with by the present disclosure is how to reduce the charging time in a single-phase charging when utilizing a charger.

One technical solution to this problem is a four-phase converter that can be used both in three-phase operation and in single-phase operation.

Such a solution enables charging up to two third of the nominal three-phase power in single-phase and thus reduces the charging time by half compared to a known in the art three-phase AC/DC converter.

One technical problem dealt with by the present disclosure is to provide a charger that can be used in the reverse mode with external loads in a more versatile manner.

One technical solution to this problem is a four-phase converter allowing the use of three independent/unbalanced single-phase loads.

One technical side effect of utilizing the disclosed subject matter is the possibility of utilizing the charger device according to the present disclosure with a load during times of non-use of the electric vehicle, to provide emergency back-up energy in the case of an electric grid outage or to serve as a generator for camping, construction sites, concerts, parties, and other areas where there are limited grid connections.

One other technical problem dealt with by the present disclosure is how to overcome mechanical wear problems of a mechanical switch used for switching between a single-phase operation mode and a three-phase operating mode.

One other technical solution is a detection and reconfiguration module that is incorporated inside the converter. The module automatically recognizes the grid configuration, and adapts the operation mode accordingly, using switches that can be relays.

A first object of the present disclosure is a charger for charging the battery of an electric vehicle from the grid, comprising: a first connector unit for connecting the charger to the grid, an AC/DC converter, a set of filters provided between said first connector unit and said AC/DC converter, and a second connector unit for connecting the charger to the battery, said charger being wherein it further comprises a configurator provided with a set of switches and/or relays capable of switching between a three-phase operation and a single-phase operation for charging said battery from the grid, said configurator being provided between said first connector unit and said set of filters.

In one embodiment, said configurator is provided with a set of switches and/or relays that is also capable of switching to and from a single-phase operation for charging said battery from the grid. Alternatively, or in addition, said configurator may be provided with a set of switches and/or relays that is also capable of switching to and from a four-phase operation for charging said battery from the grid.

In an advantageous embodiment that can be combined with any other embodiment of the present disclosure, said configurator is provided with a detection system configured to detect the grid configuration, and in particular, to identify a single-phase grid configuration and a three-phase grid configuration. Preferably, said detection system is configured to identify also a four-phase grid configuration, and/or a two-phase grid configuration.

In an advantageous embodiment that can be combined with any other embodiment of the present disclosure, said configurator is provided with a system to configure said set of switches according to the grid configuration detected by said detection system.

Said charger can further comprise a DC/DC converter provided between said AC/DC converter and said second connector unit.

In an advantageous embodiment compatible with any of the previous embodiments of the charger: said first connector unit comprises a first connector, a second connector, a third connector, and a fourth connector; said set of filters comprises a first filter line N1, a second filter line N2, a third filter line N3, and a fourth filter line N4; said first filter line N1 line being connected to said first connector, said second filter line N2 being connected to said second connector, said third filter line N3 being connected to said third connector, and said fourth filter line N4 being connected to said fourth connector; said configurator being capable of configuring said charger so that:

said first connector is configured for being connected to a first grid line in a three-phase charging mode and in a single phase charging mode, said second connector is configured for being connected to said first grid line in a single-phase charging mode, and to a second grid line in a three-phase charging mode, said third connector is configured for being connected to a third grid line in a three-phase charging mode, and to the neutral grid line in a single phase charging mode, and said fourth connector is configured for being connected to the neutral grid line in a three-phase charging mode and in a single phase charging mode.

In addition, said configurator is advantageously configured for connecting said second connector to said second grid line when switching to three-phase charging mode, for connecting said third connector to said third grid line when switching to three-phase charging mode, and for disconnecting said third connector from said third grid line when switching to single-phase charging mode.

Said configurator may comprise a first switching unit comprising a first switch allowing to reversibly connect first connector L1 with second connector L2 and a second switch allowing to reversibly connect connector L3 with fourth connector L4.

Said charger may further comprise a switch between said configurator and said AC/DC converter, allowing to reversibly derivate said third filter line N3 to said second connector unit without passing through said AC/DC converter.

In a variant that can be implemented in any of these embodiments, said charger further comprises a resistance connected in series to said configurator, and further comprises means to connect said resistance in parallel with the protective ground of the grid when said charger is connected to the grid for charging a battery.

Another object of the present disclosure is a method of operating a charger according to said latter variant, comprising a first step of connecting said charger to a grid, a second step of determining the value of said resistance, and a third step in selecting a configuration of said configurator according to the value of said resistance.

Another object of the present disclosure is the use of a charger according to any of the embodiments and/or variants of the present disclosure for charging a vehicle battery from the grid, or for providing electrical energy from the vehicle battery to at least one external load R1, and preferably simultaneously to at least two external loads R1, R2 having the same or a different resistance, and still more preferably simultaneously to three different external loads R1, R2, R3 having the same or different resistances.

Such use can be a use for alternatively charging a first battery at a first DC output voltage VH and a second battery at a second DC output voltage VL wherein VH>VL, said first battery being preferably a vehicle battery.

DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DESCRIPTION

Throughout the present description, the term switch includes a relay, i.e., an electrically operated switch.

Figure 1A:
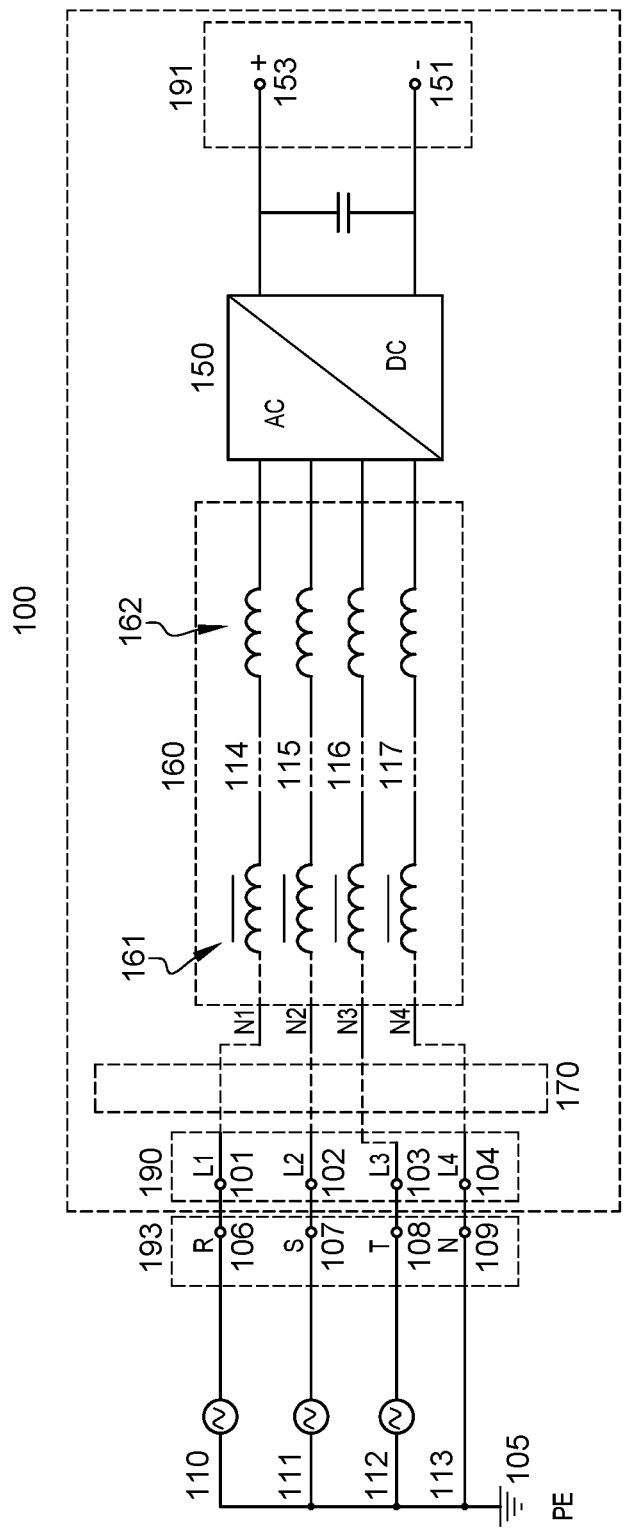
FIG. 1a shows the universal and versatile charger for electric battery configured as a charger in three-phase mode, in accordance with some exemplary embodiments of the present disclosure.

FIG. 1a shows the universal and versatile charger device for electric battery (called here simply the charger or the device, and identified by reference number 100) according to the present disclosure, configured as a charger in three-phase mode used to charge a vehicle battery, in accordance with some exemplary embodiments of the subject matter.

Charger 100 comprises four current lines referenced here as N1, N2, N3, and N4. It comprises a first set of electrical connectors 101, 102, 103, and 104, intended to be connected to the grid, and a second set of electrical connectors 153, 154 intended to be connected to a vehicle battery, which will typically be the battery of an electric vehicle (the expression electric vehicle is used to include a so-called hybrid vehicle). Any or all of said connectors of said first set of connectors and of said second set of connectors can be male pins or female socket, or any other type of connectors.

Charger 100 further comprises an AC/DC converter 150, and for each current line N1, N2, N3, and N4 a set of filters 160, said set of filters typically comprising a common mode filter 161 (which can be an inductance with a magnetic core) and a differential inductance 162. Such a set of filters is known as such, and the same applies to the AC/DC converter 150. Said AD/AC converter 150 typically uses fast power switching devices such as SiC MOSFETs.

According to an essential feature of the present disclosure the charger further comprises an ID detection and reconfiguration unit 170 (also called configurator) which will be described in more detail below in relation with FIGS. 4 and 5.

Typically, all connectors of the first set of connectors form a first connector unit 190, which can be of the socket type and/or of the plug type, and/or all connectors of the second set of connectors form a second connector unit 191, which can be of the socket type and/or of the plug type. Said first connector unit 190 comprises connectors 101, 102, 103, and 104 labelled here respectively as L1, L2, L3, and L4.

More precisely, in the three-phase operation shown in FIG. 1a, L1 connector 101 of charger 100 is connected to R connector 106 of the grid; L2 connector 102 is connected to S connector 107; L3 connector 103 is connected to T connector 108, and L4 connector 104 is connected to N connector 109.

In three-phase operation shown on FIG. 1a, said connectors L1, L2, L3, and L4 are intended to be connected to grid connectors R 106, S 107, T 108, and N 109, N being the neutral. Said grid connector R 106 is connected to grid line 110, and said grid connectors S 107 is connected to grid line 111, and said grid connector T 108 is connected to grid line 112. Said grid line N 109 is the neutral 113 of the grid, which is connected to protective ground PE 105.

As can be seen on FIG. 1a, in the three-phase operation when the charger is connected to the grid:

Grid line 110 is connected to R connector 106. Said R connector 106 is connected to L1 connector 101. Said L1 connector 101 is connected to current line N1 via a switch (not shown in the figure); said current line N1 is connected to filter line 114. Said filter line 114 is connected to said AC/DC converter 150.

Grid line 111 is connected to S connector 107. Said S connector 107 is connected to L2 connector 102. Said L2 connector 102 is connected to current line N2 via a switch (not shown in the figure); said current line N2 is connected to filter line 115. Said filter line 115 is connected to said AC/DC converter 150.

Grid line 112 is connected to T connector 108. Said T connector 108 is connected to L3 connector 103. Said L3 connector 103 is connected to current line N3 via a switch (not shown in the figure); said current line N3 is connected to filter line 116. Said filter line 116 is connected to said AC/DC converter 150.

Grid connector 109 is connected via grid line 113 to protective ground 105, and is connected to L4 connector 104. Said L4 connector 104 is connected to current line N4 via a switch (not shown in the figure); said current line N4 is connected to filter line 117. Said filter line 117 is connected to AC/DC converter 150.

The AC/DC converter 150 is connected to the battery (not shown in the figures) via connector 153 and connector 154.

Each of said filter lines 114, 115, 116, and 117 runs through each of the filters 161, 162 of the set of filters 160.

Said switches are part of said ID detection and reconfiguration unit 170 (also called configurator), as will be explained later below.

Typically, all grid connectors R, S, T, and N, which can be of the socket type or of the plug type, form part of a connector unit, reference here as to the third connector unit 193. Said third connector unit 193, which is not part of the present disclosure, is typically provided by the operator of the charging station. Said first connector unit 190 is designed to be connected, directly or via a suitable adapter unit (not shown on the figures), to said third connector unit 193.

According to an advantageous embodiment, the three-phase state configuration described herein is set by a configurator 170 (the structure of which is not shown in this figure) using a set of switches. It should be noted that in this figure, as in all other figures of this description, dotted current lines indicate the optional presence of additional components.

Figure 1B:
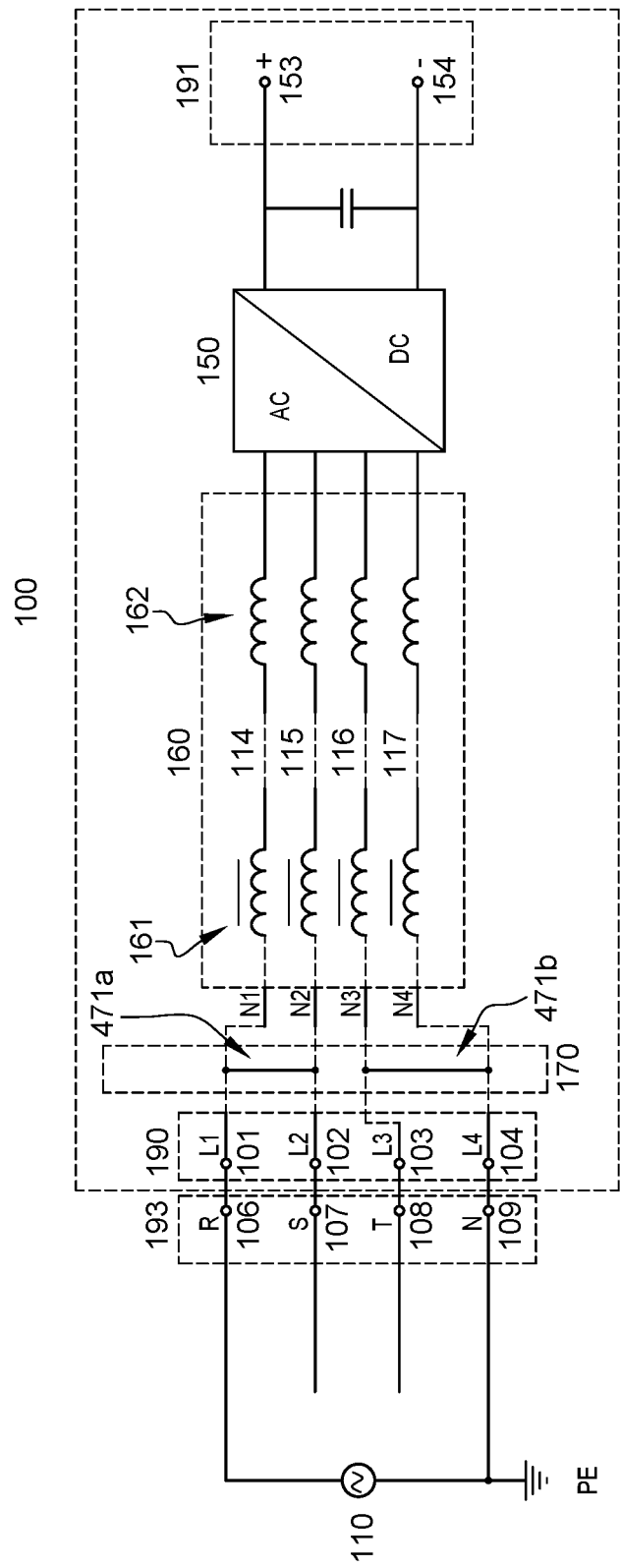
FIG. 1b shows the universal and versatile charger for electric battery configured as a charger in a single-phase mode, in accordance with some exemplary embodiments of the present disclosure.

FIG. 1b shows the same universal and versatile charger 100 for electric battery as the one shown in FIG. 1a, configured here as a charger in a single-phase mode, in accordance with some exemplary embodiments of the subject matter. This configuration, which is different from the one necessary to operate the charger 100 in the three-phase mode depicted in FIG. 1a, is achieved by a configurator 170 (the structure of which is not shown in this figure) using a set of switches.

As can be seen on FIG. 1b, in the single-phase operation when the charger 100 is connected to the grid:

Grid line 110 is connected to R connector 106. Said R connector 106 is connected to L1 connector 101. Said L1 connector 101 is connected to current line N1 via a switch (not shown in the figure); said current line N1 is connected to filter line 114. Said filter line 114 is connected to said AC/DC converter 150. Said grid line 110 connected to said R connector 106 is, by convention, the phase.

L2 connector 102 is connected to current line N2 via a switch (not shown in the figure); said current line N2 is connected to filter line 115. Said filter line 115 is connected to said AC/DC converter 150.

L3 connector 103 is connected to current line N3 via a switch (not shown in the figure); said current line N3 is connected to filter line 116. Said filter line 116 is connected to said AC/DC converter 150.

N connector 109 is connected to the protective ground (PE) 105 on the grid side, and to L4 connector 104 on the charger side. Said L4 connector 104 is connected to current line N4 via a switch (not shown in the figure); said current line N4 is connected to filter line 117. Said filter line 117 is connected to said AC/DC converter 150.

Current lines N1 and N2 are connected via a switch 471a so that said current lines N1 and N2 are running in a parallel mode. Current lines N3 and N4 are connected via a switch 471b so that said current lines N3 and N4 are running in a parallel mode.

Said switches 471a, 471b as well as the switches connecting the connectors of the first set of connectors to their respective current lines N1, N2, N3, and N4 form part of the configurator 170.

In single-phase operation the S connector 107 and the T connector 108 of the third connector unit 193 are not connected to a grid line. The AC/DC converter 150 is connected to the battery (not shown in the figures) via connectors 153 and 154 that are part of the second connector unit 191.

As mentioned before, the charger 100 used for the three-phase operation shown in FIG. 1a and the charger 100 used for the single-phase operation shown in FIG. 1b is the same device, operating in a different configuration; this capability of operating in different configurations is achieved by the configurator 170, as will be explained in more detail below.

As an example, as can be seen on FIGS. 1a and 1b, when the charger was configured for charging a vehicle battery from a grid operating in three-phase mode and is now connected to a grid operating in the single-phase mode, the configurator 170 disconnects current line N3 from connector L3 103 and connects it to connector L4 104, and it disconnects current line N2 from connector L2 102 and connects it to connector L1 101.

Figure 2:
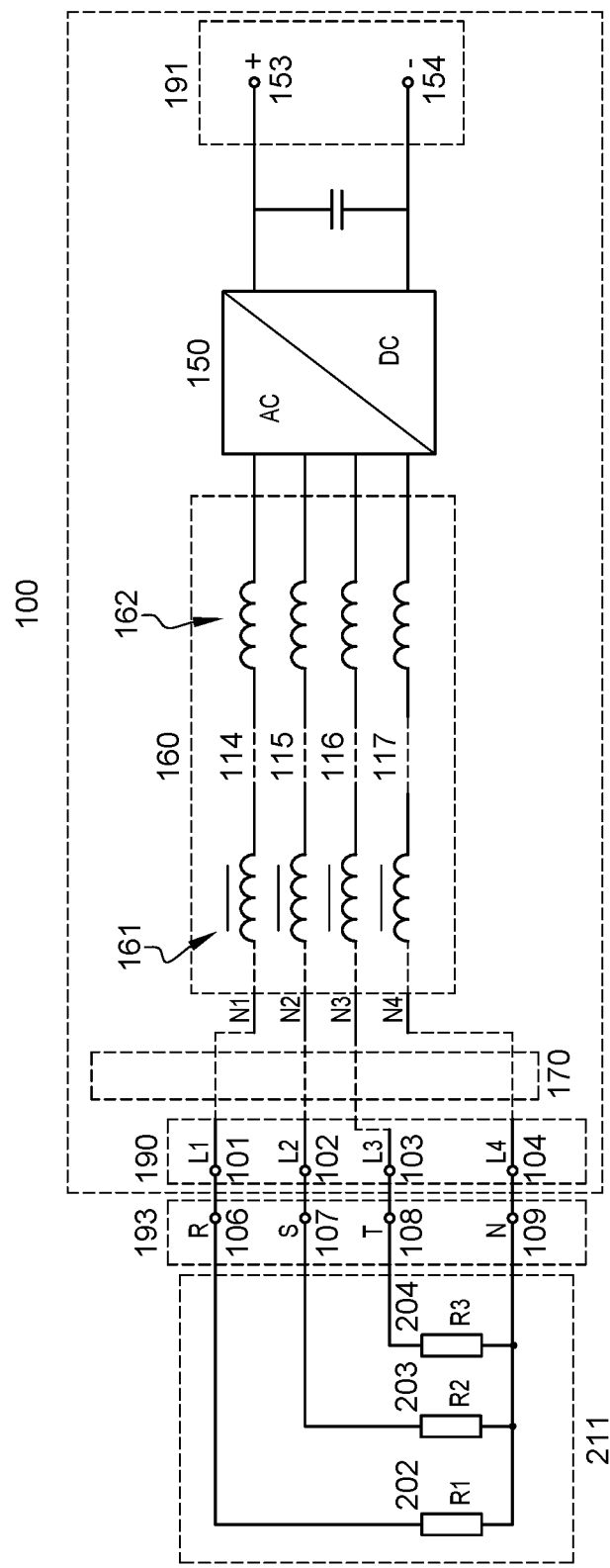
FIG. 2 shows the universal and versatile charger for electric battery configured as a V2L (vehicle-to-load) mode in three-phase operation, in accordance with some exemplary embodiments of the present disclosure.

FIG. 2 shows the same charger 100 as the one of FIG. 1, configured to operate in a so-called V2L (vehicle-to-load) mode in four-phase operation, in accordance with some exemplary embodiments of the present disclosure.

The charger 100 is connected to a load 211 in order to enable during times of non-use of the electric vehicle, the use of the vehicle batteries to provide emergency back-up energy in the case of an electric grid outage, or to serve as a power source for various electrical devices such as lighting, acoustical amplifiers or machines, for camping sites, construction sites, outdoor concerts and parties, and other areas where there is limited or no access to grid connections.

The configuration of the device 100 of FIG. 2 is the same as the one in FIG. 1a. The grid is replaced by a load 211. More precisely, up to three different loads R1 202, R2 203, R3 204 can be used simultaneously. This is not possible with prior art devices.

As can be seen from FIG. 2:

Load R1 202 is connected to connector L1 101. Said connector L1 101 is connected to current line N1 via a switch (not shown in the figure). Said current line N1 is connected to filter line 114 which, in turn, is connected to the AC/DC converter 150.

Load R2 203 is connected to connector L2 102. Said connector L2 102 is connected to current line N2 via a switch (not shown in the figure). Said current line N2 is connected to filter line 115 which, in turn, is connected to the AC/DC converter 150.

Load R3 204 is connected to connector L3 103. Said connector L3 103 is connected to current line N3 via a switch (not shown in the figure). Said current line N3 is connected to filter line 116 which, in turn, is connected to the AC/DC converter 150.

Connector N 109 is connected to current line N4. Said current line N4 is connected to filter line 117 which, in turn, is connected to the AC/DC converter 150. Connector N 109 is also connected to all loads R1, R2, and R3 in parallel.

The AC/DC converter 150 is connected to the vehicle battery (not shown in the figures) via connectors 153, 154.

It should be stressed that prior art chargers configured to operate with a grid in three-phase mode and/or single-phase mode are not able to be configured to operate also in four-phase mode. This underlines the fact that the charger according to the present disclosure provides additional flexibility.

Figure 3:
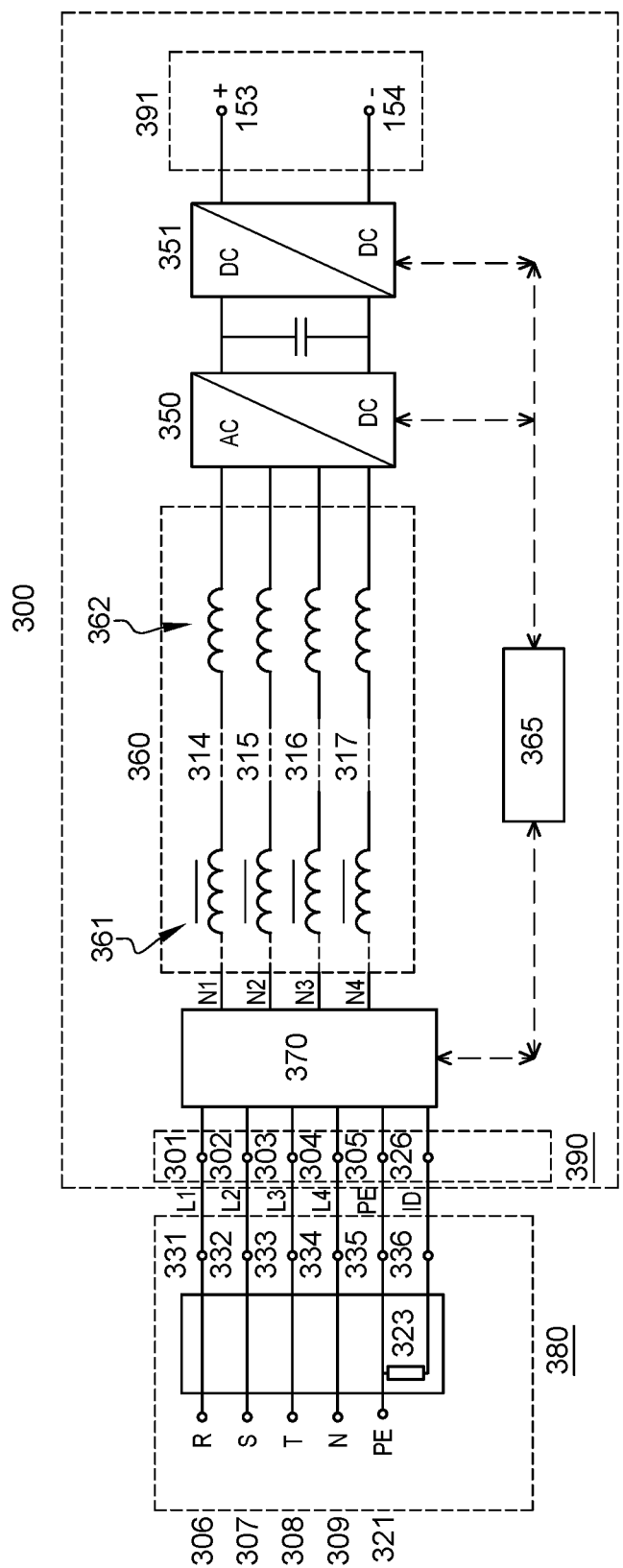
FIG. 3 shows the universal and versatile charger for electric battery with the ID detection and configuration system, in accordance with some exemplary embodiments of the present disclosure.

FIG. 3 shows the universal and versatile charger 300 for electric battery in accordance to another exemplary embodiment of the present disclosure. All reference numbers of features that are common with those in FIGS. 1 and 2 have been increased by 200. The charger operates here in a four-phase configuration. In this embodiment the first connector unit 390 has a different structure from the one depicted on FIGS. 1 and 2. Furthermore, the charger 300 is provided with a DC/DC converter 351 in addition to the AC/DC converter 350.

The first connector unit 390 comprises six connectors, five of which are intended to be connected to grid connectors when the device 300 is used as a charger in four-phase operation mode. The peculiar feature of this embodiment (which is compatible with all embodiments of the present disclosure) is the presence of a signal line ID, which will be explained below. An adapter unit 380 is used for connecting the first connector unit 390 to the grid; the third connector unit with grid connectors is not shown on this figure.

Each connector 301, 302, 303, 304, 305, and 326 of the first connector unit 390 has a corresponding connector 331, 332, 333, 334, 335, and 336 on the charger-side of the adapter 380: the L1 connector 301 matches connector 331, L2 connector 302 matches connector 332, L3 connector 303 matches connector 333, L4 connector 304 matches connector 334, PE connector 305 matches connector 336, and ID connector 326 matches connector 336. The grid side of adapter 380 has corresponding connectors: L1 connector 331 is connected to grid line R 306, L2 connector 332 is connected to grid line S 307, L3 connector 333 is connected to grid line T 308, L4 connector 334 is connected to grid line N 309, PE connector 321 is connected to the protective each PE 321.

The configuration of the charger 300 is set by switches comprised in the configurator 370. Said configurator 370 is controlled by a digital signal processor (DSP) 365 which includes a microprocessor. Said DSP 365 also receives data from the configurator 370 and from the AC/DC converter 350 and/or the DC/DC converter 351. This bidirectional communication link for digital data transfer is symbolized on FIG. 3 by dotted lines with arrows.

The DSP 365 senses the voltage signal ID derived from the protective ground PE via resistance 323, and is configured to recognize the configuration of the grid when the charger is connected to the grid. It will then configure the configurator 370 accordingly, by sending appropriate instructions to the switches of the configurator 390. Furthermore, the DSP 365 is configured such that when the user selects the V2L mode, the DSP 365 will instruct the configurator 370 to configure the circuits accordingly, using switches; this will be described below in relation with FIGS. 4 and 5. External resistance 323 can be incorporated in the AC cable or in the adapter, or added externally by the user.

The ID detection and reconfiguration unit 370 automatically recognizes the grid configuration (such as: four-phase, three-phase with/without neutral, bi-phase, single-phase). It also allows to set the charger to a V2L configuration. This will be explained in greater details in relation with FIGS. 4 and 5.

Figure 4:
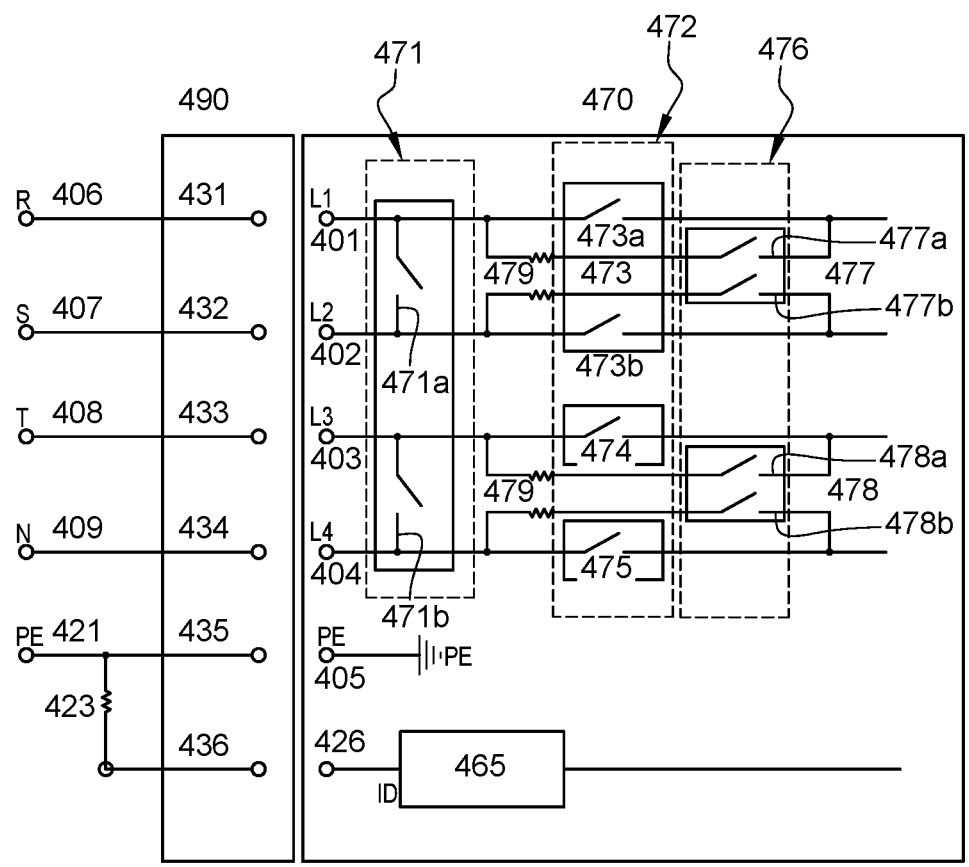
FIG. 4 shows the ID detection and reconfiguration system (also called configurator) of the charger according to an embodiment of the present disclosure.

FIG. 4 is a detailed view of the embodiment of FIG. 3, with the reference numbers for common features being increased by 100 with respect to FIG. 3, and emphasis being given to the structure and setting of the configurator 370, 470.

The configurator 470 comprises a first switching unit 471, a second switching unit 472, and a third switching unit 476. The switches of each of these switching units can advantageously be formed by two independent relays (preferably so-called 1Form A relays with a default state of normally open) operated simultaneously, or by one single relay of the 2 Form A type (this terminology being known to a person skilled in the art of electrical engineering).

Said first switching unit 471 comprises two switches 471a, 471b. As can be seen from FIG. 1b, they are closed in case of charging in single-phase mode; this allows to charge up to two third of the nominal three-phase mode power, thereby allowing the reduction of the charging time by half compared to the state of the art. In other operating modes switches 471a, 471b are open.

Said third switching unit 476 is optional. It comprises two switching subunits 477, 478, each of which comprises two switches 477a, 477b, 478a, and 478b. These switching subunits 477, 478 are pre-charge relays used for passive precharge of the DC bus capacitors. Once the precharge is done, these relays can be opened.

Said second switching unit 472 comprises three switching subunits 473, 474, and 475. The first 473 and second 474 switching subunits are main AC relays. They are closed in case of charging in the single-phase or three-phase mode once the pre-charge is over. The first switching unit 473 comprises two switches 473a, 473b. The third switching subunit 475 is only closed in single-phase mode charging or in the case of three-phase mode charging with neutral. However, it is preferred that in case of unbalanced three-phase systems with neutral, when the charger is connected to the AC grid, switch 475 be opened to force the homopolar (or zero sequence) current to zero.

Resistors 479 between the first 471 and second 472 switching unit are so-called precharge resistors, known as such. Their function is to precharge the capacitive elements, in order to avoid a peak of inrush current; such a peak inrush current could be capable of damaging switches, input capacitors, fuses and battery cells.

The connectors L1 401, L2 402, L3 403, L4 404, and PE 405 as well as the connector for the ID cable 426 are configured to be connectable to a six pins AC connector 490. Said AC connector 490 allows to connect: the L1 connector 401 via current line 431 to the R connector 406 of the grid, the L2 connector 402 via current line 432 to the S connector 407 of the grid, the L3 connector 403 via current line 433 to the T connector 408 of the grid, the L4 connector 404 via current line 434 to the N connector 409 of the grid, and the PE connector 405 via current line 435 to the protective ground 421 of the grid.

The ID connector 426 is connected via current line 436 in series to an external resistance 423 that connects in parallel with the protective ground 421 of the grid. The manufacturer of the charger specifies to the user the value of the external resistance 423 to be added for each operation mode. Alternatively, a kit of n adapters 480 can be supplied with the charger 470 to be incorporated between the converter input and the five pins AC connector, wherein n is the number of possible configurations of the grid. These adapters incorporate the resistance 423, and therefore each of these adapters is characterised by a specific value of adapter resistance 423. This is shown on FIG. 5.

Figure 5:
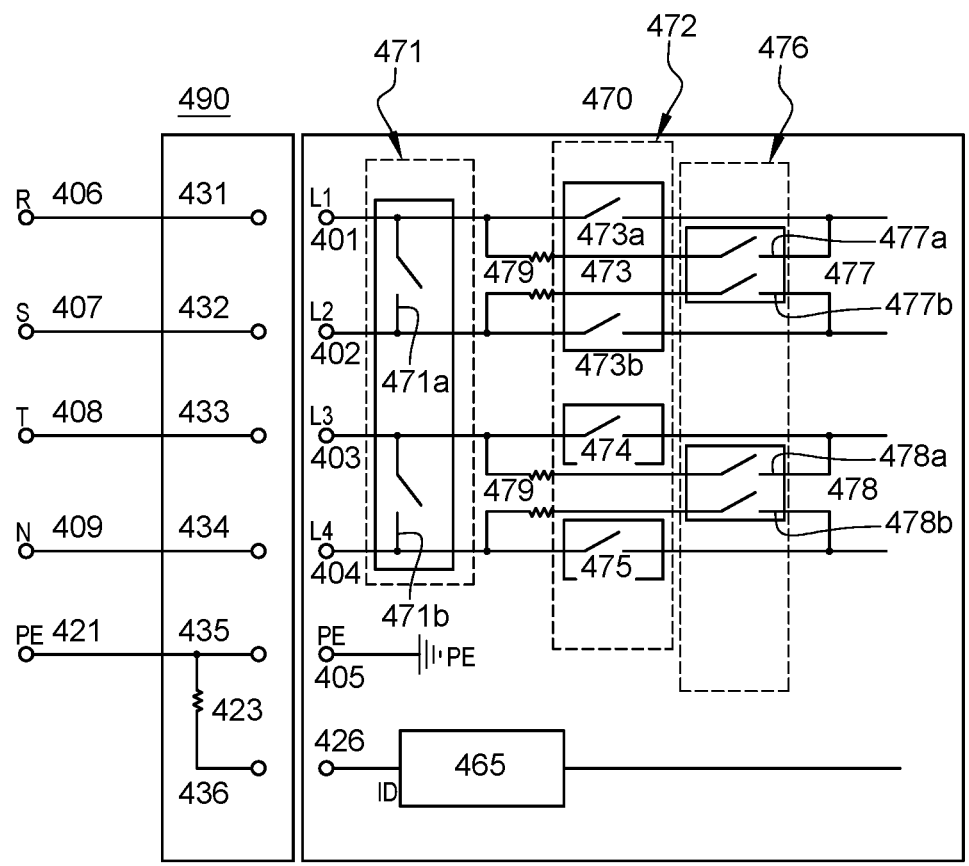
FIG. 5 shows a variant of the configurator with an adapter.
Figure 6:
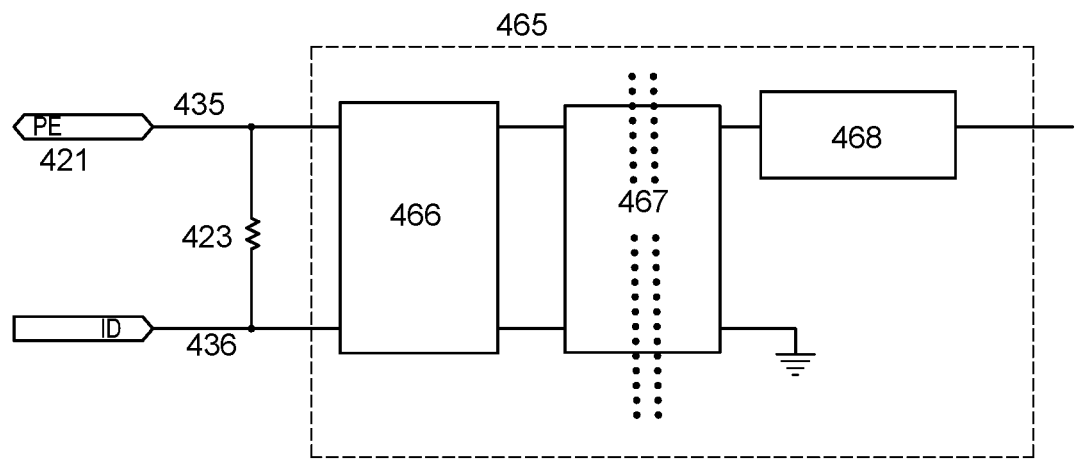
FIG. 6 shows the ID detection block circuit of the charger according to an embodiment of the present disclosure.

FIG. 6 shows the ID detection circuit 461 which comprises a differential amplifier 466, the output signal of which is transferred via an optocoupler 467 to a DSP 465. It is by the measurement of the voltages at both extremities of resistance 423 that the DSP 465 will deduce the phase configuration of the grid via voltage signal ID 468; the DSP then sends the appropriate signals to configurator 470 which will then set up the appropriate configuration by opening and/or closing switches, as described above in relation with FIGS. 4 and 5. The measured voltage signal ID 468 is a bijective and invertible function of the resistor 423. Each measured voltage is paired with exactly one resistor value, and each resistor value is paired with exactly one and unique measured voltage. For example, the function $Y=C1*X/(C2+X)$ can be used where C1, C2, X is the resistor value in kilo-Ohms of the resistance 423 and Y is the measured voltage 468 in Volts. In this dimensional equation C1 is a numerical coefficient (equal to 3.3) and C2 is a resistance value (equal to 20 k$\Omega$).

As an example, the following voltages have been measured for a given value of resistance 423: 100 k$\Omega \rightarrow$2.75 V; 70 k$\Omega \rightarrow$2.6 V; 49 k$\Omega \rightarrow$2.4 V; 22 k$\Omega \rightarrow$1.7 V; 10 k$\Omega \rightarrow$1.15 V; 4.7 k$\Omega \rightarrow$0.63 V; 0 k$\Omega \rightarrow$0 V.

As stated hereinabove, in V2L configuration, the topology of the device according to the present disclosure allows feeding three independent single-phase loads, instead of one according to the state of the art. The return current of the three potential independent loads flows through phase N designed to withstand the rated current as the other phases.

Figure 7:
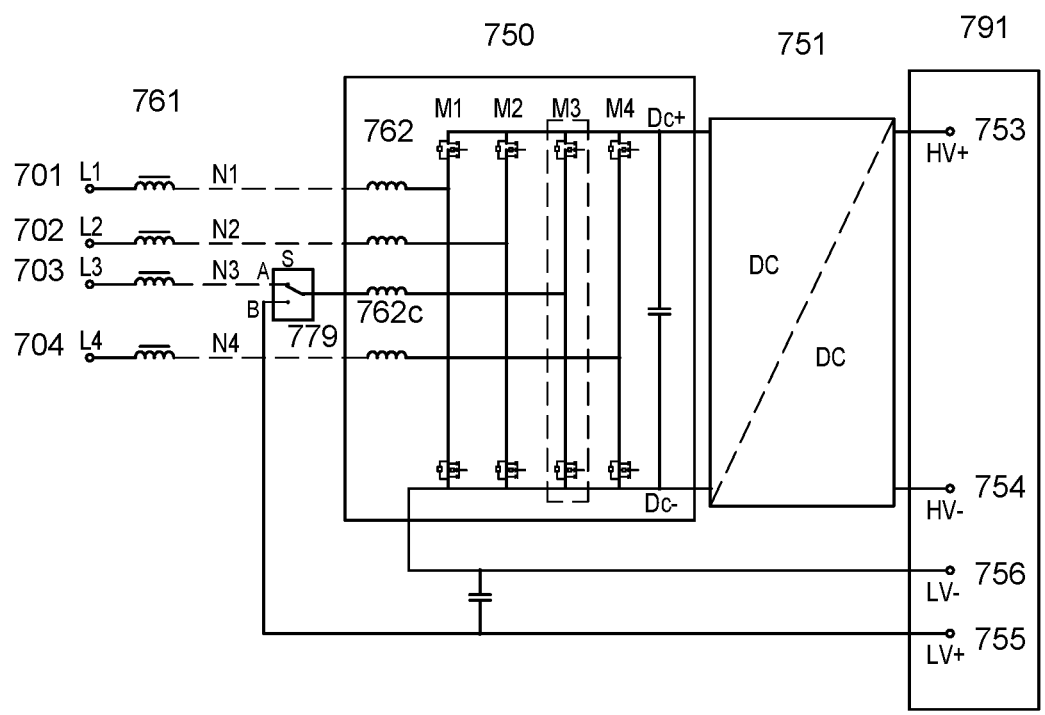
FIG. 7 shows the AC/DC converter of the charger according to another embodiment of the present disclosure.

In a variant of the present disclosure, shown in FIG. 7, an additional fourth switching unit S 779 is provided between the output of the AC filter L3 and the differential inductance 762 filter of current line N3 (this differential inductance being here referenced as 762c). Said fourth switching unit 779 comprises a single pole/double throw (SPDT) type switch designated here as S, having two positions labeled as A and B.

This variant allows to have alternatively two different DC output voltages when the charger is used in single-phase mode. To this end the charger is provided with a first and a second set of connectors with DC output. In particular it is provided with a first set of connectors 753, 754 with DC output at a first voltage VH, the first connector 753 being the positive connector HV+, the second connector 754 being the negative connector HV−, and said charger is also provided with a second set of connectors 755, 756 with DC output at a second voltage VL, the first connector 755 being the positive connector LV+, the second connector 756 being the negative connector LV−, and wherein VH>VL.

FIG. 7 also shows a detail of the AC/DC converter 750, which can be a converter according to the state of the art, having four legs which are labelled here M1, M2, M3, and M4. This converter comprises an additional fourth switching unit 779 which can of the single pole changeover type; it can be in position A or in position B.

During single-phase charging at P/3 [kW], fourth switching unit S 779 is switched to position B and the leg M3 is operated as a step-down converter. It converts the voltage from the DC bus (DC+, DC−) to the LV load. This variant allows feeding two independent loads: a high voltage load at the (HV+, HV−) terminals and a LV load at (LV+, LV−) terminals, which is not possible in prior art devices. When not used, S relay 779 is kept in position A.

It should be noted that in case of single-phase charging at P/3 [kW] at least one rectifier/inverter leg is not used, leading to a low utilization factor of the device.

We will describe here examples of operating the device according to the present disclosure. This description is based on the following exemplary configurations:

Resistance 423=R(a) for single-phase P/3 [kW] charging operation;

Resistance 423=R(b) for single-phase 2*P/3 [kW] charging operation;

Resistance 423=R(c) for three-phase P [kW] charging operation (without neutral);

Resistance 423=R(d) for four-phase P [kW] charging operation (three-phase with neutral);

Resistance 423=R(e) for single-phase P/3 [kW] charging operation in the configuration of FIG. 7; and If no resistance 423 is used, the charger will be in disable mode and no power transfer is allowed.

It should be recalled that resistance 423 can be an appropriate external resistance or the resistance of the adapter.

In an alternate embodiment (not shown on the figures) of the present disclosure, the identification method of grid configuration does not use resistance 323, 423 but is based on line modulation (voltage modulation or current modulation) or radio modulation (such as Near Field Communication or RFID). Typically, the adapter unit 380 can comprise a system carrying or generating a signal comprising encoded information on the grid configuration which can be detected by the configurator 370; the configurator is configured to interpret said information and configurate the circuits according to said grid configuration, as explained above. As an example, the adapter unit 380 can comprise an RFID tag which contains information about the grid configuration; this RFID tag can be read by a detection device in functional connection with configurator 370.

Based on these exemplary configurations, hereafter is detailed, with reference to FIGS. 4, 5, and 7, some practical examples of usage of the present disclosure after the user plugs the AC connector and the ID detection block measures the corresponding voltage at the extremities of resistance 423:

In the case where R(a) is used:
Switches of the first switching unit 471 are always open (in OFF mode),
Switch S 779 is in position A,
Switches 477, 478 of the third switching unit 476 are closed to allow the pre-charge of the DC bus capacitors, and
First 473 and third 475 switching subunit of second switching unit 472 are closed (third switching subunit 475 can remain in OFF mode) once the pre-charge is over and switches 477, 478 of the third switching unit 476 are opened.

In the case where R(b) is used:
Switches of the first switching unit 471 are closed (in ON mode),
Switch S 779 is in position A,
Switches 477, 478 of the third switching unit 476 are closed to allow the pre-charge of the DC bus capacitors, and
First 473, second 474a and third 475 switching subunit of the second switching unit 472 are closed once the pre-charge is over and switches 477, 478 of the third switching unit 476 are opened.

In the case where R(c) is used:
Switches of the first switching unit 471 are always open (in OFF mode),
Switch S 779 is in position A,
Third switching subunit 475 of the second switching unit 472 is always open (in OFF mode),
Switches 477, 478 of the third switching unit 476 are closed to allow the pre-charge of the DC bus capacitors, and
Second 474 and third 475 switching subunit of the second switching unit 472 are closed once the pre-charge is over and switches 477, 478 of the third switching unit 476 are opened.

In the case where R(d) is used:
Switches of the first switching unit 471 are always open (in OFF mode),
Switch S 779 is in position A,
Switches 477, 478 of the third switching unit 476 are closed to allow the pre-charge of the DC bus capacitors, and
First 473, second 474 and third 475 switching subunit of the second switching unit 472 are closed once the pre-charge is over and switches 477, 478 of the third switching unit 476 are opened.

In the case where R(e) is used:
Switches of the first switching unit 471 are always open (in OFF mode),
Switch S 779 is in position B,
Switches 477, 478 of the third switching unit 476 are closed to allow the pre-charge of the DC bus capacitors, and
First 473 and third 475 switching subunit of the second switching unit 472 are closed (second switching subunit 474 can remain in OFF mode) once the pre-charge is over and switches 477, 478 of the third switching unit 476 are opened.

In the grid-to-vehicle (G2V) mode the charger according to the present disclosure can be operated with virtually any grid power, and is in particuclar independent of the voltage and frequency of the single-phase or three-phase power grid. As an example, it can be operated with the following single-phase grids: 230 V/50 Hz European grid, 100 V/50 Hz or 100 V/60 Hz Japanese grid, 120 V/60 Hz US grid. The charger according to the present disclosure can not only be used for charging batteries of electric vehicles, but also for charging batteries of energy storage systems and industrial supplies. It can be operated also in the vehicle-to-load (V2L) and in the vehicle-to-grid (V2G) mode.

A particularly advantageous charger according to the present disclosure is configured such that upon connecting said charger to a grid, the value of said resistance 323, 423 is determined, and a configuration of said configurator 170, 470 according to the value of said resistance is selected, as described above. This allows the charger to adapt automatically to the grid voltage and grid configuration.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

LIST OF REFERENCE SYMBOLS

The following reference numbers are used on the figures and in the description and claims:
- 100, 300 Charger according to the present disclosure
- 101-104, 301-304, 326, 601, 702-704 Connectors of charger 100, 300 intended to be connected to the grid
- 105, 321 Protective ground
- 106-109, 306-309 Connectors of grid intended to be connected to charger 100, 300
- 110-112 First, second, and third grid line
- 113 Neutral grid line
- 114-117, 314-317 Filter line
- 150, 350, 750 AC/DC converter
- 153, 154, 353, 354 Positive and negative connectors intended to be connected to vehicle battery
- 160, 360 Set of filters
- 161, 361, 761 Common mode filter (part of 160, 360)
- 162, 362 Differential inductance (part of 160, 360)
- 170, 370, 470 ID detection and reconfiguration unit (configurator)
- 190, 390 First connector unit, for connectors 101-104
- 191, 791 Second connector unit, for connectors 153, 154
- 193 Third connector unit, for connectors 106-109
- 323, 423 Resistance (external resistance or adapter resistance)
- 331-336 Connectors on the charger-side of adapter unit 380
- 351, 751 DC/DC converter
- 365, 465 Digital Signal Processor (DSP)
- 380 Adapter unit
- 426 ID connector
- 461 ID detection block circuit
- 466 Differential amplifier
- 467 Optocoupler
- 468 Voltage signal ID (identification voltage)
- 471, 472, 476 First, second, and third switching unit
- 471a, 471b, 473a, 473b, 477a, 477b, 478a, 478b Switches (part of 471, 473, 477, 478, respectively)
- 473-475 Switching subunits
- 479 Precharge resistor
- 753-756 First and second set of connectors with DC output
- 779 Fourth switching unit

What is claimed is:

1. A charger for charging the battery of an electric vehicle from the grid, the charger comprising:
   a first connector unit operable to connect the charger to the grid;
   an AC/DC converter;
   a set of filters provided between said first connector unit and said AC/DC converter;
   a second connector unit operable to connect the charger to the battery; and
   a configurator having a set of switches and/or relays operable to switch between a three-phase operation and a single-phase operation to charge said battery from the grid, said configurator being provided between said first connector unit and said set of filters, wherein:
      said first connector unit comprises a first connector, a second connector, a third connector, and a fourth connector;
      said set of filters comprises a first filter line connected to said first connector, a second filter line connected to said second connector, a third filter line connected to said third connector, and a fourth filter line connected to said fourth connector;
      said configurator operable to configure said charger so that:
         said first connector is operable for connection to a first grid line in a three-phase charging mode and in a single phase charging mode,
         said second connector is operable for connection to said first grid line in a single-phase charging mode, and to a second grid line in a three-phase charging mode,
         said third connector is operable for connection to a third grid line in a three-phase charging mode, and to the neutral grid line in a single phase charging mode, and
         said fourth connector is operable for connection to the neutral grid line in a three-phase charging mode and in a single phase charging mode.

2. The charger of claim 1, wherein said set of switches and/or relays of said configurator are operable to switch to and from a single-phase operation for charging said battery from the grid.

3. The charger of claim 1, wherein said set of switches and/or relays of said configurator are operable to switch to and from a four-phase operation for charging said battery from the grid.

4. The charger of claim 1, wherein said configurator includes a detection system operable to detect the grid configuration and to identify a single-phase grid configuration, a two-phase grid configuration, and a three-phase grid configuration.

5. The charger of claim 1, wherein said detection system is operable to identify a four-phase grid configuration.

6. The charger of claim 5, wherein said configurator is provided with a system operable to configure said set of switches according to the grid configuration detected by said detection system.

7. The charger of claim 1, further comprising a DC/DC converter provided between said AC/DC converter and said second connector unit.

8. The charger of claim 7, wherein said configurator is operable to:
   connect said second connector to said second grid line when switching to a three-phase charging mode, connect said third connector to said third grid line when switching to the three-phase charging mode, and disconnect said third connector from said third grid line when switching to the single-phase charging mode.

9. The charger of claim 8, wherein said configurator comprises a first switching unit having:
a first switch operable to allow a reversible connection between said first connector and said second connector, and
a second switch operable to allow a reversible connection between said third connector and said fourth connector.

10. The charger of claim 9, further comprising a switch between said configurator and said AC/DC converter, said switch being operable to reversibly derivate said third filter line to said second connector unit without passing through said AC/DC converter.

11. The charger of claim 10, further comprising:
a resistance connected in series to said configurator, and
a connector operable to connect said resistance in parallel with a protective ground of the grid when said charger is connected to the grid for charging a battery.

12. The charger of claim 11, wherein:
a value of said resistance is determined upon connection of said charger to a grid, and
a configuration of said configurator according to the determined value of said resistance is selected.

\* \* \* \* \*